United States Patent Office 3,519,804
Patented July 7, 1970

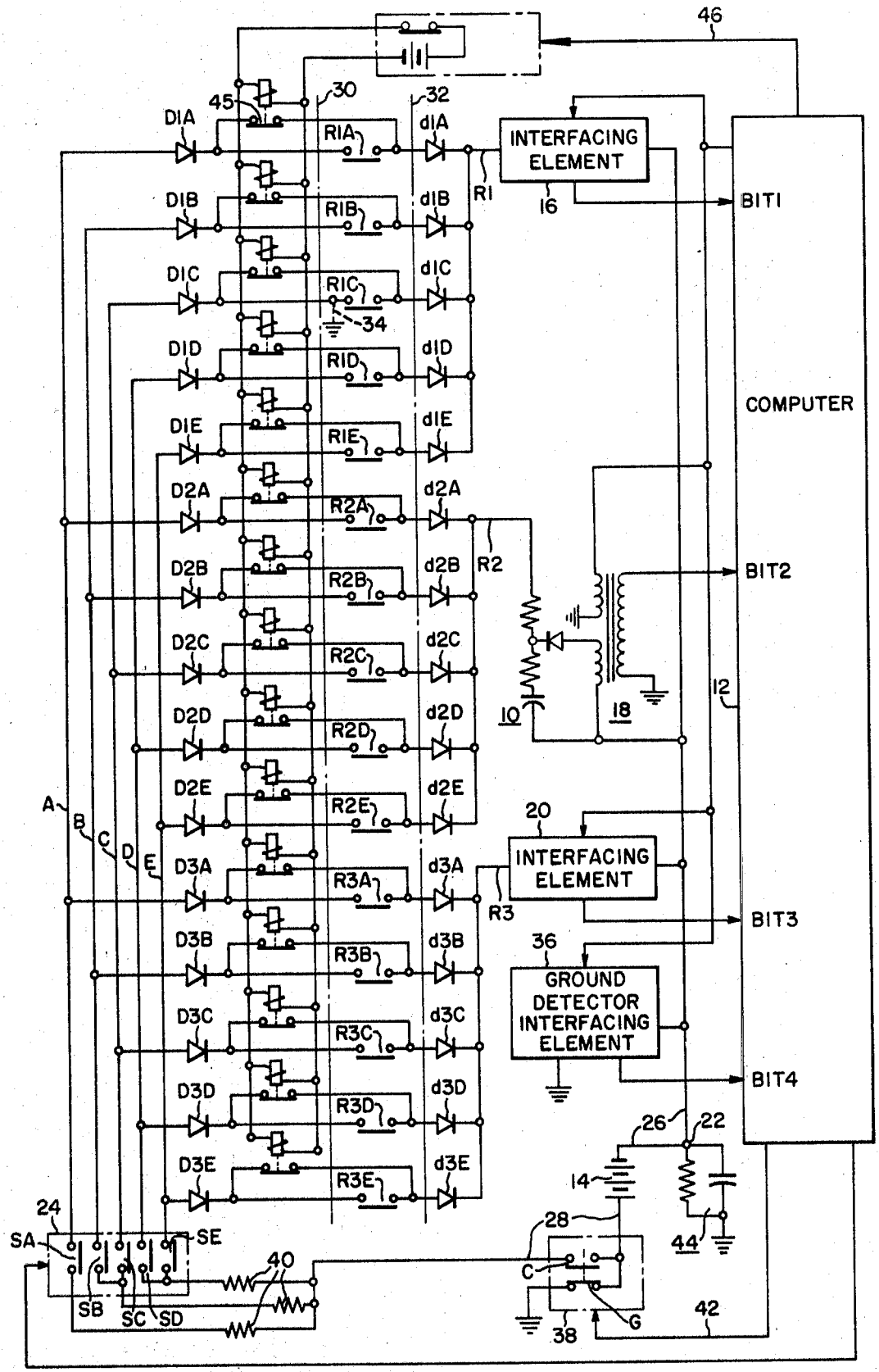

3,519,804
GROUND DETECTION CIRCUITRY FOR COMPUTER INPUT CONTACT INTERFACING SYSTEM
Raymond L. Billingsley, Detroit, Mich., assignor to Westinghouse Electric Corporation, Pittsburgh, Pa., a corporation of Pennsylvania
Filed Jan. 25, 1967, Ser. No. 611,696
Int. Cl. G06f 11/04
U.S. Cl. 235—153    8 Claims

ABSTRACT OF THE DISCLOSURE

Input contact path ground faults are located in a computer input contact interfacing system by means of binary outputs generated by interfacing elements in response to periodic ground detection circuit operation. The ground test is made frequently and is initiated by a computer controlled switching device to be compatible with the normal contact status interfacing functioning of the system.

BACKGROUND OF THE INVENTION

The present invention relates to input contact interfacing systems for digital computers, and more particularly to circuitry adapted to detect ground conditions in such systems.

Digital process computer applications often require the use of an interfacing system to supply computer input data on the status of a large number of contacts which represent the state of respective predetermined conditions in the process or apparatus under control or instrumentation. Some input contacts, for example, may be operated by relays which are actuated by temperature, flow or pressure sensor circuits or by motor control or position indicator circuits. As a further illustration, some input contacts may be operated by limit switches actuated by machine or apparatus parts at end of movement locations. Numerous other conditions can similarly be inputted to a computer through contacts.

In one common type of system, the input contacts are connected in the input interfacing system and electrically isolated from all other circuitry. Voltage can thus be applied sequentially to each input contact or each of predetermined groups of input contacts from a ground coupled voltage supply to identify contact continuity, i.e., a return current either flows or does not flow to ground depending on whether a contact closure exists. Interfacing elements respectively associated with one or more input contacts produce respective binary outputs to the computer in response to the flow or no flow of current through the sequentially interrogated input contacts.

A computer controlled multiplexer circuit can be employed to apply the interrogation voltage sequentially to groups of input contact paths, when each interfacing element services a plurality of input contacts, and in that event the wiring of the multiplexer switching paths to the input contact paths determines the input contact status inerrogation sequence, while the computer controls the rate at which complete status interrogations of the input contact system are made. The computer also directs and times the probing of the interfacing elements in correspondence with the input contact multiplexing sequence. Inputted binary data is appropriately stored in the computer memory.

In many cases, the input contacts are placed in a plant at a remote location from the computer or are otherwise so located as to subject the input contact circuit wiring to environmental effects which can cause the development of ground faults. When a ground fault does ocur, erroneous binary outputs can be generated by the computer interfacing elements. To assure the correctness of the computer input data, it is therefore desirable to provide programmed interface system ground detection compatible with the normal input contact interfacing function.

SUMMARY OF THE INVENTION

In acordance with the broad principles of the present invention, ground detection circuitry is efficiently arranged for controlled periodic ground testing of a computer input contact interfacing system. A ground test switch or relay or other means is preferably operated by the computer in a ground detection or interrogation cycle and a ground return circuit is thereby completed from the power supply through a ground detection interfacing element. In the ground detection cycle, all of the input contact paths are preferably operated to a closed state and if an input contact path is grounded, another ground return circuit is completed from the power supply through the interfacing element associated with the grounded input contact path. Simultaneous generation of a 1 bit in the ground detection interfacing element and in an input contact interfacing element accordingly signifies the existence of a ground fault.

If a multiplexing system is employed to accommodate more than one input contact path per input contact interfacing element, further information is required to determine the particular path having the ground fault. The ground test switch is accordingly returned to normal and the multiplexing system is operated to interrogate the closed input contacts in the normal sequence. When the input contact path having the ground fault is energized, a ground return circuit is completed through the ground detection interfacing element and a 1 bit is thus generated to complete the detection data. After ground fault identification, the computer displays or otherwise indicates the ground test result, and, depending on programming, the input contacts may or may not be returned to normal process control with reestablishment of the normal input contact interrogation cycle.

It is therefore an object of the invention to provide a novel ground detection circuit which operates with a computer input contact interfacing system to enable the development of accurate computer input contact status data.

Another object of the invention is to provide a novel ground detection circuit for efficiently detecting ground faults in a computer input contact interfacing system.

A further objet of the invention is to provide a novel ground detection circuit which operates compatibly with a computer input contact interfacing system in cyclically producing input contact interrogation and input contact path ground fault interrogation under computer control.

An additional object of the invention is to provide a novel ground detection circuit for a computer input contact interfacing system which is capable of locating a ground faulted input contact path even though respective groups of input contact paths are associated by a multiplexing system with respective interfacing elements.

These and other objects of the invention will become more apparent upon consideration of the following detailed description along with the attached drawing, in which:

BRIEF DESCRIPTION OF THE DRAWING

The only figure shows a schematic diagram of a circuit arranged in accordance with the principles of the invention to detect ground faults in a computer input contact interfacing system.

DESCRIPTION OF THE PREFERRED EMBODIMENT

More specifically, there is shown in the drawing an input contact interfacing system 10 arranged and operated in accordance with the principles of the invention to supply accurate input contact status data for a digital computer 12. Other input systems (not shown) such as an analog to digital input conversion system and a teletypewriter input interfacing system can also be coupled to the computer 12. In operation, the computer 12 can be provided with preselected output equipment (not shown) for real time control of some plant process or equipment (not shown). The computer 12 itself can be any suitable commercially available device.

A plurality of input contacts R1A through R1E, R2A through R2E, and R3A through R3E are associated with predetermined process or apparatus variables and included in the interfacing system 12 for periodic contact status interrogation. Contact closure or non-closure indicates the status of the associated process or apparatus variable. The number of input contacts connected in the interfacing system 10 in this case is fifteen, but in general is variable over a wide range from computer application to computer application. Each input contact can be part of any suitable mechanical or electronic switching means.

Each input contact is connected in an input contact path for application of an interrogation voltage from a suitable direct voltage source 14. A contact status interfacing element 16 or 18 or 20 is connected to each input contact path to provide a binary output to the computer 12, i.e. a 1 bit or a 0 bit is generated according to whether a current flows or does not flow through the interrogated input contact path.

As illustratively shown for element 18, each interfacing element can be in the form of a three winding transformer with a resistor and a back connected diode and the transformer input winding connected in the input contact path from the associated contact to a common connection indicated by the reference character 22. An RC circuit is connected across the diode and the transformer input winding. An output winding of the transformer is coupled to a computer input register or the like. The third transformer winding receives timed computer probe pulses which induce a 1 bit in the output winding if the input capacitor is at a high voltage due to an immediately preceding application of interrogation voltage with the interrogated input contact in a closed state. No induced voltage or a 0 bit occurs in the output winding if the immediately preceding interrogation resulted in a low or zero capacitor voltage due to an open state of the interrogated input contact.

In order to reduce the interfacing element hardware, a single interfacing element is commonly connected in a plurality of input contact paths with multiplexing employed for sequential interrogation of the grouped contacts. In this case, the interfacing elements 16, 18 and 20 are respectively commonly connected through row conductors R1, R2 and R3 and respective groups of five input contacts each. A multiplexer subsystem 24 includes respective switchable paths for contacts SA through SE to control the sequential application of interrogation voltage to the input contacts in the three input contact groups. Column conductors A through E connect each of the switch elements SA through SE with one input contact in each of the three input contact groups in order to make all of the interfacing elements operational for each multiplex switching operation. For example, when the multiplex switch element SA is closed, interrogation voltage is applied to the input contacts R1A, R2A and R3A in the three input contact groups.

Preferably, the computer 12 controls the operation of the multiplexer 24 at least to the extent of determining whether it is in operation or not. Once gated to operate by the computer 12, the multiplexer 24 can operate at a switching rate fixed by internal parameters. Suitable well known electronic circuitry can be employed for the multiplexer 24.

In summary of the input interrogation circuitry, it is noted that circuit branches 26 and 28 respectively from the interfacing elements 16, 18 and 20 and the multiplexer 24 to the voltage source 14 are common to all of the input contact paths. The column conductors A through E are common to respective groups of three input contact paths, and the row conductors R1 through R3 and the interfacing elements 16, 18 and 20 are common to respective groups of five input paths.

It is further noted that diodes $d1A$ through $d1E$, $d2A$ through $d2E$, and $d3A$ through $d3E$ are respectively connected in the input contact paths to isolate electrically the column conductors A through E from each other. In particular, the diodes $d$ prevent voltage application from an energized column conductor to unenergized column conductors through the input contact wiring to the right of the diodes $d$ in the drawing.

Normal contact status interrogation is performed on a cyclical basis under programmed computer control. In each contact status interrogation cycle, the multiplexer 24 is gated and the multiplexer switches SA through SE are closed and reopened in sequence. Interrogation voltage is thus sequentially applied to the column conductors A through E.

In each multiplexer switch closure period, the interfacing elements 16, 18 and 20 produce bits 1, 2 and 3 at a 0 or 1 value according to whether the input contacts connected in the column conductor under interrogation are opened or closed. In the drawing, all normally open contacts 45 shunting the input contacts are shown in the closed state only to aid in subsequent description of ground detection. Normally any combination of contact closures or openings could exist during any one contact closure interrogation cycle.

During or after each multiplexing operation, the computer input data is stored in the computer memory. In the illustrated input interfacing system 10, all fifteen of the bits produced by one cycle of input contact status interrogation can for example be stored as a single word in a memory having a 15 bit word length.

Ground faults are most likely in the input contacts or through the wiring between dashed reference lines 30 and 32 which define by enclosure remote locations where plant or other adverse environmental conditions exist. On the other hand, all circuitry and components to the left of the reference line 30 and to the right of the reference line 32 are physically at the computer or control site and thus least likely to develop ground faults. The wiring between the reference lines 30 and 32 can be quite lengthy depending on the relative locations of the input contacts and the computer or control site. As one application example, the input contacts can be associated with a computer controlled transfer machine or other machine tool, and water, metallic dust, coolants and the like can be some of the more common causes of the development of ground faults at the equipment locations.

Erroneous contact status indications can be produced by various ground fault circumstances. For example, mating contact members might be shorted through ground by liquid electrolyte and thus result in an erroneous closure indication. Any other spaced ground faults could result in the same or a similar kind of contact status error indication. In the case of a single ground fault, such as that indicated by the reference character 34 to the left of the input contact R1C, no contact status error indication results in the system 10 because the input contact paths are not looped through ground, i.e., the power supply 14 drives current through the input contact paths without using ground for return flow. In conventional ground return type systems, however, single ground faults do result in error indications since such faults produce interface element bypassing. Even though single ground faults result in no contact status error indication in the system 10, such faults are detected for correction and possible avoidance of multiple fault conditions.

In accordance with the principles of the present invention, ground detection circuitry operates efficiently in the interfacing system 10 to detect the presence of ground faults. It includes a ground detection interfacing element 36 similar or identical to the interfacing elements 16, 18 and 20, but it is switchably connected in a ground return loop with the voltage supply 14. Thus, the ground detection interfacing element 36 is connected between ground and the negative side of the voltage supply 14 through the circuit branch 26 while a computer controlled switching device 38 is connected from the positive side of the voltage supply 14 to ground.

Preferably, the switching device 38 is a computer output ground test relay having a normally closed ground test contact G connecting the voltage supply 14 to ground and a normally open contact C which when closed connects the voltage supply 14 through the circuit branch 28 and one or more current limiting resistors 40 to the multiplexer 24. The relay 38 is preferably computer controlled as indicated by the reference character 42.

In conventional input contact interfacing systems, a solid earth D.C. ground is typically provided at the junction between the power supply and the computer interfacing elements (i.e., at a circuit point similar to the junction 22). In the system 10, direct grounding of the junction 22 conflicts with the functioning of the ground detection circuitry. A different arrangement is accordingly employed in establishing a ground for the interfacing circuitry of the system 10. Thus, the input contact paths are operated independently of the D.C. ground potential level as previously indicated, and preferably an RC circuit 44 is connected from the junction 22 to ground in order to provide noise signal filtering by holding the input contact paths including the column and row conductors and the circuit branches 26 and 28 at A.C. ground potential level.

In operation, the ground test is preferably made as a part of the total interrogation cycling of the input interfacing system 10. For example, each complete interrogation cycle may include under computer control a ground detection or interrogation cycle after some predetermined number of input contact status interrogation cycles. The ground interrogation cycle may for example be made after every ten contact status interrogation cycles. Further consideration is given to the ground test frequency subsequently herein.

At the beginning of the ground interrogation cycle, successive groups of the input contact paths may be sequentially closed but preferably all of the input contact paths are simultaneously closed as by the indicated separate shunting relay contacts 45 which are operated by a computer directed master control such as a relay as indicated by the reference character 46. On the other hand, prudent selection of the type of input contact (normally open or normally closed) and the point in the control cycle when the interrogation is made can be directed to achieving simultaneous input contact closure.

The relay contact G, in its normally closed state, causes a 1 value bit to be generated by the ground detection interfacing element 36 as bit 4. The relay contact C is open and the multiplexer 24 is inoperative resulting in bits 1 through 3 having 0 value if no ground fault exists in the interfacing system 10. However, if a ground fault does exist, a 1 bit is generated by one of the interfacing elements 16, 18 or 20. For example, the ground fault 34 causes a current to flow from the voltage supply 14 through the relay contact G, the contact 45 shunting the input contact R1C, the row conductor R1, and the interfacing element 16 back to the voltage supply 14. The coincidence of 1 values for bit 1 and bit 4 indicates a ground fault in one of the input contact paths common to the row conductor R1. Ground test data is similarly developed if, instead of the ground 34, a ground occurs at some other input contact path point on either side of the contacts R.

In general, a ground fault is detected when bit 4 has a 1 value and bit 1 or 2 or 3 has a 1 value. The particular bit indication obtained gives the row detection portion of ground fault location.

In order to identify completely the particular input contact path suffering from a ground fault when the fault is detected by row location, an ordinary input contact status interrogation cycle is initiated and thus made a part of the ground interrogation cycle while all of the shunt contacts 45 are still closed. In this part of the ground interrogation cycle, each column voltage application results in a 1 bit output from each of the interfacing elements 16, 18 and 20. When the interrogating column voltage is applied to the input contact path having the ground fault, the ground detection interfacing element 36 also produces a 1 bit. The identification of the grounded input contact path is thus completed (i.e., row and column detection).

To isolate the input contact paths from each other particularly during the ground interrogation cycle, it is preferred that diodes $d1A$ through $d1E$, $d2A$ through $d2E$, and $d3A$ through $d3E$ be connected between the respective input contacts and the row conductors R1, R2 and R3. During interrogation, ungrounded input contact paths thus generate correct 1 bits without bypass bypass grounding through a grounded path not then being interrogated.

After completion of the ground interrogation cycle, the shunt contacts 45 are released from master control and opened, and the input contacts R continue in open or closed states depending upon the status of the various process variables being sensed. The next input contact status interrogation cycle is then started if no ground fault has been detected. When a ground fault does exist, its location can be printed, displayed or otherwise indicated by the computer 12 and the interrogation cycling may or may not be continued.

It is further noted that multiple ground faults can occur at the same time or in the same time period between successive ground tests. In that event, the present embodiment correctly indicates the location of all of the faults only if all of the faults have the same row location or the same column location. In general, the number of indicated faults equals the square of the number of different column and different row simultaneous faults. For example, two simultaneous faults having different row and column locations would result in four indicated faults. In order to avoid or minimize such ground fault error indications in an efficient and economic manner, it is preferred that the ground test be made frequently to make it highly probable that ground faults will be detected substantially as they occur.

The foregoing description has been presented only to illustrate the principles of the invention. Accordingly, it is desired that the invention not be limited by the embodiment described, but, rather that it be accorded an interpretation consistent with the scope and spirit of its broad principles.

What is claimed is:

1. In a computer input interfacing system having a plurality of input contacts and a plurality of contact status interfacing elements coupled to the computer and connected with the input contacts in input contact status interrogation paths energizable from a voltage source, a ground detection circuit operative during a ground interrogation cycle having a predetermined repetition frequency and comprising a ground detection interfacing element coupled to the computer and connected in a ground return path with the voltage source, means for closing at least some of the input contact paths in the ground interrogation cycle, and means for withholding the source voltage from application to the input contacts through the input contact paths and for applying the source voltage to said ground detection interfacing element during at least a part of the ground interrogation cycle.

2. A ground detection circuit as set forth in claim 1 wherein the ground interrogation cycle is computer controlled and said withholding and applying means comprises switching means coupled to the computer output and having contact means connected in the ground detection interfacing element path and operated to a closed state in the one part of the ground interrogation cycle, and contact means connected in the input contact paths and operated to an open state in the one part of the ground interrogation cycle.

3. A ground detection circuit as set forth in claim 1 wherein an RC filter circuit is coupled from the input contact paths to ground.

4. A ground detection circuit as set forth in claim 1 wherein all of the input contact paths are closed in the ground interrogation cycle and respective groups of input contact paths and input contacts are associated with the respective contact status interfacing elements, multiplexer means are connected in said paths for application of source voltage commonly across one input contact path from each contact path group in a predetermined sequence, and means for operating said withholding means during another part of the ground interrogation cycle to apply the source voltage under multiplexer control across the closed input contact paths and for simultaneously operating said applying means to withhold said source voltage from said ground detection interfacing element.

5. A ground detection circuit as set forth in claim 4 wherein the last mentioned operating means becomes effective only if a ground fault is detected by current flow in at least one of the contact status interfacing elements during energization of the ground detection interfacing element.

6. A ground detection circuit as set forth in claim 4 wherein said withholding and applying means comprises a computer output relay having a normally open contact and a normally closed contact.

7. A ground detection circuit as set forth in claim 4 wherein an input contact path isolating diode is connected in each input contact path between the input contact in that path and the associated contact status interfacing element.

8. A ground detection circuit as set forth in claim 7 wherein said multiplexer means is connected between said withholding and applying means and said input contacts and another input contact path isolating diode is connected in each input contact path between the input contact in that path and said multiplexer means.

References Cited

UNITED STATES PATENTS 2,786,988   3/1957   Bergman.
3,068,460   12/1962  Uhrig et al. _ _ _ _ _ _ _ _ _ _ _ 324—52

MALCOLM A. MORRISON, Primary Examiner

R. S. DILDINE, Jr., Assistant Examiner

U.S. Cl. X.R.
324—52; 340—255